United States Patent
Schank et al.

(10) Patent No.: US 7,793,304 B2
(45) Date of Patent: Sep. 7, 2010

(54) SYSTEM AND METHOD FOR MONITORING MEMORY USAGE

(75) Inventors: Eric David Schank, Austin, TX (US); Steven Smith, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 1287 days.

(21) Appl. No.: 11/121,556

(22) Filed: May 4, 2005

(65) Prior Publication Data
US 2006/0253507 A1 Nov. 9, 2006

(51) Int. Cl.
G06F 3/00 (2006.01)
G06F 9/44 (2006.01)
G06F 9/46 (2006.01)
G06F 13/00 (2006.01)

(52) U.S. Cl. .................. 719/320; 717/130
(58) Field of Classification Search ........... 719/320; 717/130
See application file for complete search history.

(56) References Cited

U.S. PATENT DOCUMENTS

| 6,338,159 | B1 * | 1/2002 | Alexander et al. | 717/128 |
|---|---|---|---|---|
| 6,658,652 | B1 * | 12/2003 | Alexander et al. | 717/128 |
| 7,047,521 | B2 * | 5/2006 | Bunnell | 717/130 |
| 7,155,571 | B2 * | 12/2006 | LaVoie et al. | 711/118 |
| 7,398,369 | B2 * | 7/2008 | Dickenson | 711/170 |
| 7,434,206 | B2 * | 10/2008 | Seidman et al. | 717/124 |
| 2002/0019716 | A1 * | 2/2002 | Agesen et al. | 702/83 |
| 2006/0085156 | A1 * | 4/2006 | Kolawa et al. | 702/119 |

* cited by examiner

*Primary Examiner*—Hyung S Sough
*Assistant Examiner*—KimbleAnn Verdi
(74) *Attorney, Agent, or Firm*—Advantedge Law Group

(57) ABSTRACT

A method of monitoring memory usage includes determining whether memory monitoring is enabled within an application server environment from within an application within the application server environment and creating a memory allocation event after determining that memory monitoring is enabled. The memory allocation event is associated with an object. The method further includes allocating memory to the object.

17 Claims, 16 Drawing Sheets

```
public class Blah
implements Allocateable, Updateable
{
    String s;
    Object[] arr1;
    public Blah()                                                              ←802
    {        if(GlobalMemoryEnabled OR TransactionMemoryEnabled)
             {                                                                 ←804
                    processMemoryAllocationEvent_Blah();
             }                                                                 ←806
             s = memory_proxy_String_init(new String("this is a string"));
             arr1 = new Object[1];
    }
    private static String memory_proxy_String_init(String arg0)
    {        if(TransacationMemoryEnabled && !(arg0 instanceof Allocateable))  ←808
             {
                    createTransactionMemoryEvent("String", arg0);              ←810
                    return arg0;
             }
             if(GlobalMemoryEnabled && !(arg0 instanceof Allocateable))        ←812
             {
                    createGlobalMemoryEvent("String", arg0);
             }                                                                 ←814
             return arg0;
    }
    public int getArraySizes_Blah()
    {        int i = 0;
             int k = arr1.length;                                              ←816
             i += k * 4;
             return i;
    }
    public int getObjectSize()
    {        int i = getArraySizes_Blah();                                     ←818
             return i + baseObjectSize;
    }
    public void processMemoryAllocationEvent_blah_Blah()
    {     if(TransactionMemoryEnabled)
          {
              createTransactionMemoryEvent("Blah", this, baseObjectSize);
                      return;
          }                                                                    ←820
          else
          {
              createGlobalMemoryEvent("Blah", this, baseObjectSize);
                      return;
          }
    }
}
```

FIG. 8

```
Class FooBarCaller
{
        public void doIt()
        {
                FooBar b = new memory_proxy_FooBar_init(new FooBar()); 1002
        } private static FooBar memory_proxy_FooBar_init(FooBar arg0)
        {                                                                    1004
                if(TransacationMemoryEnabled && !(arg0 instanceof
Allocateable))
                {                                                            1006
                        createTransactionMemoryEvent("FooBar", arg0);
                        return arg0;
                }
                if(GlobalMemoryEnabled && !(arg0 instanceof Allocateable))
                {
                        createGlobalMemoryEvent("FooBar", arg0);
                }
                return arg0;                                    1008
        }                                            1010
}
```

FIG. 10

```
public void memoryAllocation(
        String className,
        Object object,
        int objectSize)
{
        MemoryFilter filter = findMatchingMemoryFilter(className);
        if(filter == null)
        {
                return;
        }
        ClassObject classObject = findCachedClassObject();
        if (classObject == null)
        {
                createAndCacheNewClassObject();
        }
        classObject.incrementAllocations();
        int objectID = getObjectId(object);
        InstanceObject instanceObject = new InstanceObject(objectID, object, objectSize);

instanceObject.setReference(new WeakReference(object));
        instanceObject.setAllocationTime(getCurrentTimestamp());
        instanceObject.setLocation(getLocation(filter.depth));
        instanceObject.setUpdateSize(filter.updateSize);
        classObject.addInstanceObject(instanceObject);
}
```

FIG. 11

```
                                                              /-1300
public void run()
{       for each class in Cached Class List
        {       ClassObject classObject = getNextCachedClassObject();   /-1302
                for each instance in classObject's Cached Instance List
                {
                        InstanceObject instanceObject =         /-1304
classObject.getNextCachedInstanceObject();
                                                                /-1306
                        if (!instanceObject.allocationSent)
                        {
                                Memory memoryObject = new
Memory(classObject.getClassName(),                              /-1308
ALLOCATION_EVENT_FLAG, instanceObject.getObjectID(),
instanceObject.getObjectSize(), instanceObject.getTimestamp(),
instanceObject.getLocation());                                  /-1310
                                sendMemoryEventToServer(memoryObject);
                                instanceObject.allocationSent = true;
                        }                                       /-1312
                        Object object = instanceObject.getReference().get();
                        if (object == null)
                        {
                                if (!instanceObject.deallocationSent)
                                {                               /-1314
                                        Memory memoryObject = new
Memory(classObject.getClassName(), DEALLOCATION_EVENT_FLAG,
instanceObject.getObjectID());
                                        sendMemoryEventToServer(memoryObject);
                                        instanceObject.deallocationSent = true;
                                }                               \-1316
                                classObject.incrementDeallocations();
                                classObject.instancesTable.remove(new
Integer(instanceObject.getHashCode()));
                        }                                       /-1318
                        else if(instanceObject.updateSize && object instanceof
Updateable)
                        {
                                instanceObject.setObjectSize(object.getObjectSize());
                                Memory memoryObject = new       /-1320
Memory(classObject.getClassName(), UPDATE_SIZE_EVENT_FLAG,
instanceObject.getObjectID(), instanceObject.getObjectSize());
                                sendMemoryEventToServer(memoryObject);
                }}}                                             \-1322
```

FIG. 13

SYSTEM AND METHOD FOR MONITORING MEMORY USAGE

FIELD OF THE DISCLOSURE

This disclosure generally relates to systems and method for monitoring memory usage.

BACKGROUND

Many industries are increasingly turning to the use of application servers to facilitate processing of transactions. With the increased use of web-based interaction, application servers are used to facilitate interaction with legacy information systems, to access databases, and to provide content for web pages. Application servers may also be used to provide cross-tier communications for accessing remote resources and for distributing computing resource usage.

SUMMARY

In a particular embodiment, the disclosure is directed to a method of monitoring memory usage. The method includes determining whether memory monitoring is enabled within an application server environment from within an application within the application server environment and creating a memory allocation event after determining that memory monitoring is enabled. The memory allocation event is associated with an object. The method further includes allocating memory to the object.

In another exemplary embodiment, the disclosure is directed to a computer readable media including computer-implemented instructions operable by a processor to acquire a reference to a class instance from an instance object, to determine whether the class instance has been deallocated, and to send a memory event notification in response to determining that the class instance has been deallocated.

In a further exemplary embodiment, the disclosure is directed to a monitoring system including a set of cached class objects within a computer memory, a set of instance objects within the computer memory, and an application. The set of cached class objects include a cached class object that includes a reference to a class. The set of instance objects include an instance object that includes a reference to an instance of the class. The application is operable to access the set of cached class objects and the set of instance objects to acquire the instance object and is operable to determine whether memory associated with the instance of the class referenced by the instance object has been deallocated.

In an additional embodiment, the disclosure is directed to a method of instrumenting an application. The method includes receiving a class prior to loading the class onto an application server. The class includes a memory allocation instruction. The method further includes adding instructions to the class to produce a modified class. The added instructions are operable to create a memory event associated with the memory allocation instruction. The method also includes loading the modified class onto the application server.

BRIEF DESCRIPTION OF THE DRAWINGS

The present disclosure may be better understood, and its numerous features and advantages made apparent to those skilled in the art by referencing the accompanying drawings.

FIGS. 7, 8, 9, 10, and 11 include illustrations of exemplary computer implemented classes.

FIG. 13 includes an illustration of an exemplary computer implemented class.

The use of the same reference symbols in different drawings indicates similar or identical items.

DESCRIPTION OF THE DRAWING(S)

In a particular embodiment, the disclosure is directed to enterprise environments, methods for monitoring resource usage within such enterprise environments and applications running in application server environments on servers located within such enterprise environments. Instrumented applications and the methods implemented by instrumented applications monitor memory allocation and deallocation associated with the execution of class instances or objects. Such memory monitoring may be performed globally, for a user-defined set of applications, or for specific transactions. In addition, the disclosure is directed to methods for instrumenting applications such that the applications include memory monitoring instructions.

In practice, application servers often have many applications that are repeatedly executed. Each instance of an application can consume excessive amounts of computing resources, such as memory. Poorly written applications can consume excessive amounts of computing resources and can cause slow performance of computing systems. For example, a small error in memory usage in a single application can overflow available memory space when executed many times. In JAVA environments, unused memory is generally recycled automatically, often termed "garbage collecting." However, when an application utilizing excess memory is executed many times between each garbage collection cycle, the application may overflow available memory. In addition, poorly written applications may fail to release memory for garbage collection or may persist pointers to objects in memory that are no longer useful, resulting in memory not recognized for garbage collection in certain environments, such as JAVA-based environments.

In addition, interfaces have been developed for certain application environments. For example, the JAVA VIRTUAL MACHINE Profile Interface (JVMPI) has been developed for JAVA-based environments. The JVMPI is an interface between a JAVA VIRTUAL MACHINE (JVM) and a profiler agent and is used by the JVM and profiler agent to communicate events, such as thread starts and heap allocations. Such interfaces may also consume a large amount of computing resources. As such, these interfaces often perform poorly in enterprise production environments.

Much of the following discussion focuses on ways to employ teachings of the present disclosure within improved tools for monitoring memory usage in enterprise production environments. This focused discussion is not intended to limit the scope of the present invention, but rather to improve the readability of the description.

Figure 1:
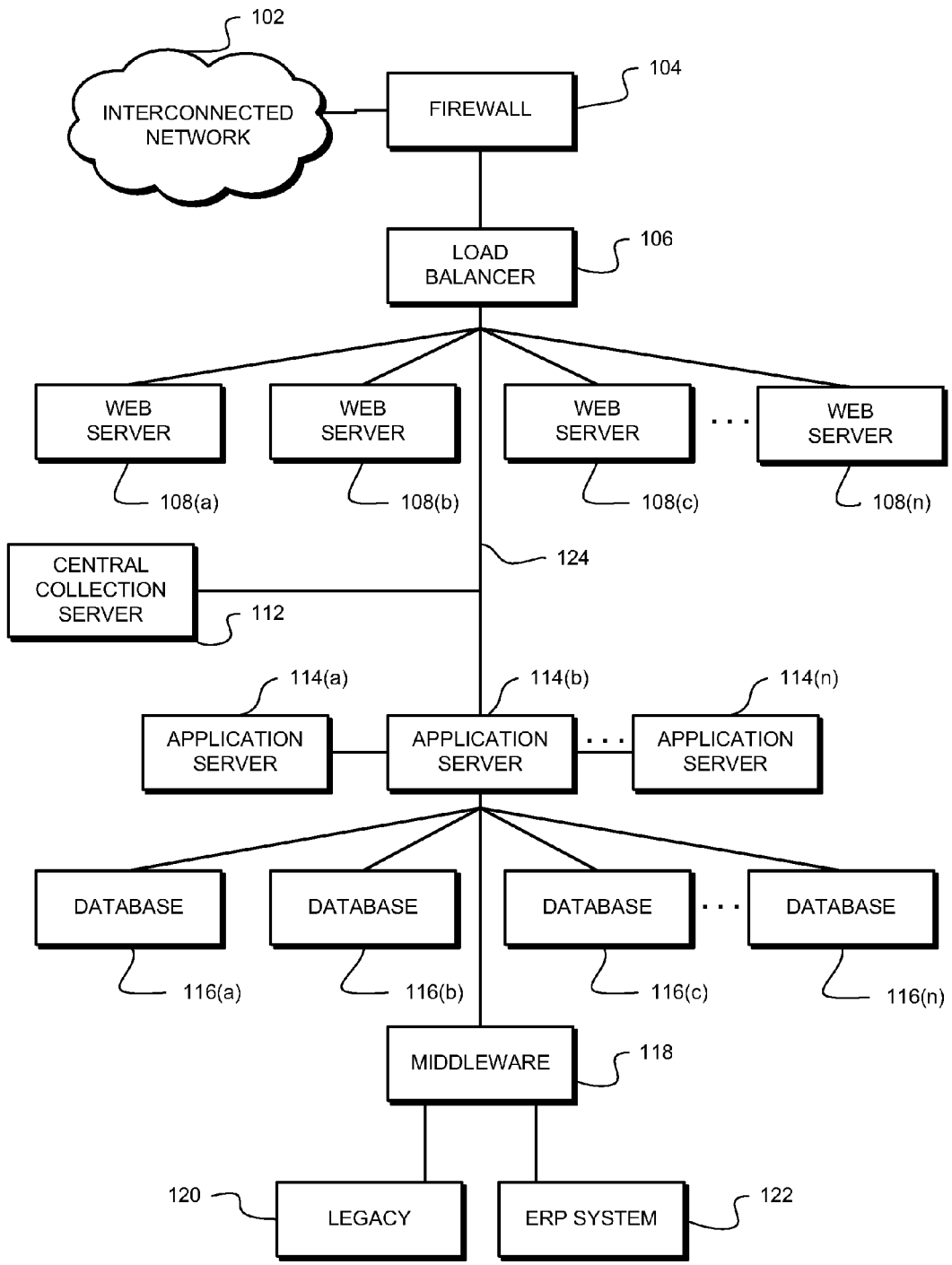
FIG. 1 includes an illustration of an exemplary enterprise system.

FIG. 1 is a block diagram depicting an exemplary computing environment, such as a large-scale production environment or an enterprise network environment. As illustrated, the computing network includes one or more application servers 114(a)-(n). In addition, the computing network may include a firewall 104, a load balancer 106, one or more web servers 108(a)-(n), one or more databases 116(a) (n), middleware systems 118, legacy systems 120 and ERP systems 122. The computing environment may also include a central collection server 112. Each of these elements may be communicatively coupled to a network 124.

In one example, a user or remote computing system accesses the computing environment through an interconnected network 102, such as a global interconnected network, wide area network, or the Internet. Transaction requests are processed through the firewall 104 and the load balancer 106. In a particular example of a web-based interaction, the load balancer 106 directs a request to one of the set of web servers 108(a)-(n).

The web servers 108(a)-(n) may, for example, serve web pages containing data and results from one or more transactions, such as process requests to application servers 114(a)-(n) and queries to databases 116(a)-(n), legacy systems 120 and ERP systems 122. The web servers 108(a)-(n) may include application server environments. In addition, the web servers 108(a)-(n) may access other application servers 114(a)-(n) having application server environments. Typically, applications within the application server environments of the web servers 108(a)-(n) and of the application servers 114(a)-(n) function to perform calculations and access databases 116(a)-(n), the middleware 118, the legacy system 120 and the ERP systems 122. In addition, individual applications may access other applications within the application server environment or within other application server environments located on other application servers.

Instrumented applications within these application server environments may trace transactions, log performance characteristics associated with the performance and execution of transaction requests, and provide data useful in monitoring memory usage of applications executed to perform the transactions. These logs of performance characteristics may be stored locally and periodically collected by the central collection server 112. In addition, data associated with memory allocation and deallocation may be transmitted to the central collection server 112. In one exemplary embodiment, the central collection server 112 functions to interpret log data and memory allocation/deallocation data from the web servers 108(a)-(n) and application servers 114(a)-(n). The central collection server 112 may also function to provide an interface to data associated with memory usage and transaction performance. In addition, the central collection server 112 may provide an interface to activate memory monitoring and transaction tracing and to supply filters.

Figure 2:
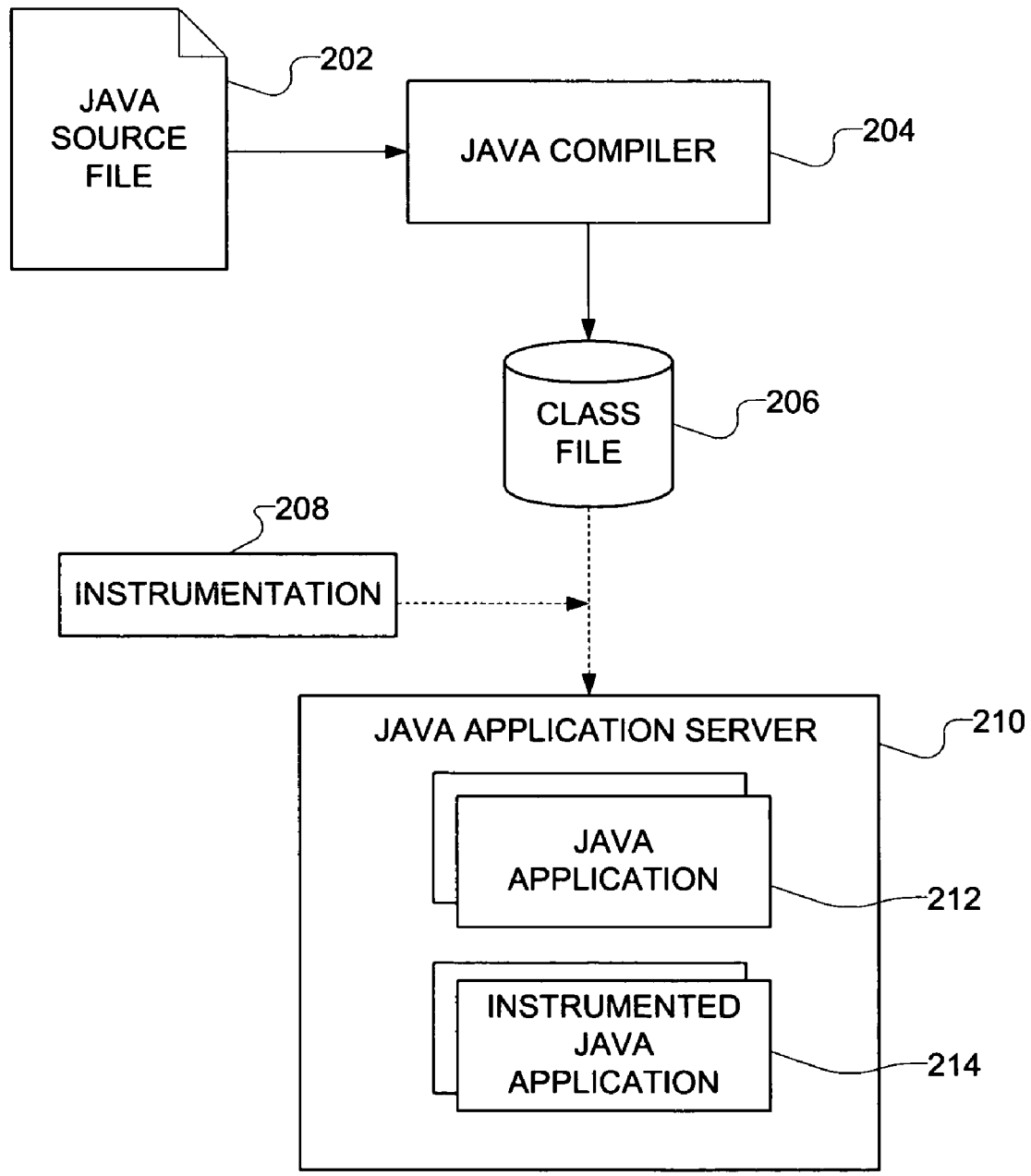
FIGS. 2, 3 and 4 include flow diagrams illustrating exemplary methods for instrumenting a computer-implemented application. The term "JAVA," used in FIG. 2, is a registered trademark of Sun Microsystems, Inc.

FIG. 2 depicts an exemplary method for instrumenting an application. In this particular example, the method depicts instrumenting a JAVA application. However, instrumentation may be implemented for other applications developed in other languages, such as MICROSOFT's .NET®Framework, including C#and VISUAL BASIC.NET.

As depicted for a JAVA based system, a JAVA source file 202 is compiled by JAVA compiler 204 into class file 206. Typically, a JAVA application server loads and processes the class file 206 to form JAVA application 212. To instrument an application, an instrumentation program is executed to manipulate the class file 206 prior to loading by the application server 210, automatically adding instrumentation instructions 208 during preprocessing of the class file bytes. Instrumentation instructions 208 are instructions inserted within the application that add memory monitoring or transaction tracing functionality to application and are typically added automatically through processing the class file. In one exemplary embodiment, the instrumenting program is called as an extension of the application level class loader to preprocess the class file 206 before a defined class call is made.

In an exemplary application server environment, such as WebLogic®, the extension may be specified by weblogic.classloader.preprocesser and implements weblogic.utils.classloaders.classpreprocesser. In another exemplary application server environment, such as Web Sphere®, the extension may be specified by com.ibm.websphere.classloader.plugin and implements com.ibm.websphere.classloader.classloaderplugin. Once the instrumented class file bytes are loaded, the application server 210 includes an instrumented application 214.

In a NET® Framework, an assembly is processed to permit execution in a Common Language Runtime (CLR) environment. Typically, at distinct points during the processing of the assembly, access is provided for (i) adding a class, (ii) modifying a class, (iii) adding a method within a class, or (iv) modifying a method within a class. In one particular embodiment, instrumentation, such as proxy classes and methods, may be added during the processing of an assembly by adding a class or method during the distinct point in the processing in which a class or method may be added. The newly added class or method is provided with a pointer that points to memory space occupied by an existing class or method. At a point in the process in which methods may be modified, the newly added methods are modified to point to a memory space including new instructions that provide the method with the desired functionality and instrumentation.

In another embodiment, existing methods may be modified. For example, an instrumentation program may process a memory space associated with a particular method, formulate an object structure from the instructions and data within the memory space, and generate an instrumented version of the instructions and data. The particular method is provided a pointer to the instrumented version of the particular method.

Figure 3:
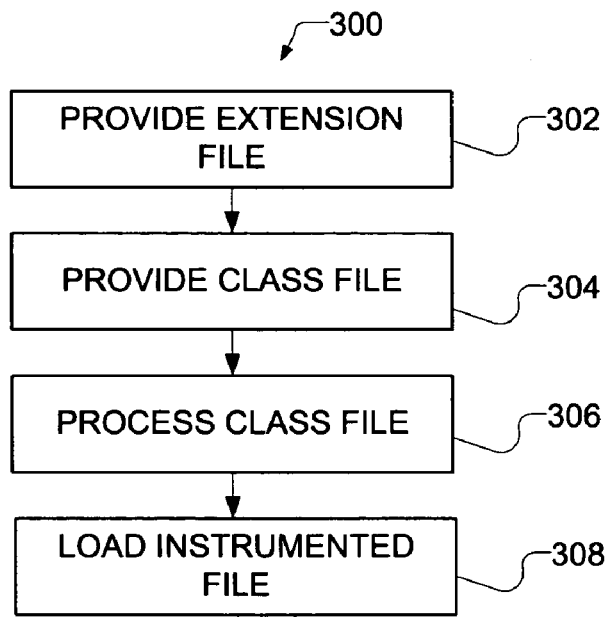

FIG. 3 is a flow diagram depicting an exemplary method 300 of instrumenting software applications to provide tracing capabilities. A program or extension is provided to the application server environment, as illustrated step 302. The program provides methods for interpreting classes and for implementation of instrumentation within those classes, such as through preprocessing a class file including the classes. A class file is provided to the application server environment, as illustrated at step 304. Prior to loading, the application server preprocesses the class bytes using the program or extension to produce an instrumented class, as illustrated at step 306. For example, the class may be processed to add instrumentation for tracking object creation and memory allocation. The instrumented class is loaded as an instrumented application, as illustrated at step 308.

Figure 4:
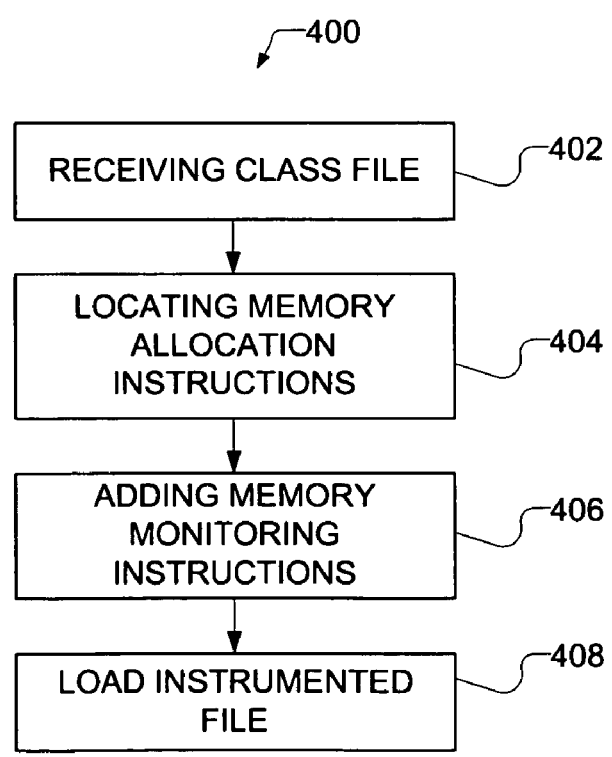

The class may be processed to add conditional logic, tracing and logging instructions, exception handling instructions, and subroutines. In one exemplary embodiment, methods within the class file are processed to provide memory monitoring instrumentation. For example, instructions may be added to the class to create memory monitoring events in response to memory allocation instructions. Conditional logic is added to determine whether memory monitoring is enabled. FIG. 4 is a flow diagram depicting an exemplary method 400 for instrumenting an application. The class file is interpreted, as illustrated at step 402. Instruction lines or coding within the class are reviewed to determine the location of object creation and memory allocation instructions, as illustrated at step 404. Memory monitoring instructions are added to the class, as illustrated at step 406. In one example, conditional logic is added to determine whether the memory monitoring instructions are to be performed. The modified class is then loaded into the application environment, as illustrated at step 408. In a particular embodiment, processing the class file including locating the memory allocation instructions and adding memory monitoring instructions is performed automatically prior to loading the class into the application environment. The loaded class or application is a class that may be instantiated to produce a class instance or object.

Referencing FIG. 2, the application server environment 210 may include a global variable, Boolean variable, or flag to indicate whether memory monitoring is enabled for the environment. Alternatively, memory monitoring may be enabled for specific transactions. The instrumented application 214 may include conditional logic to determine whether memory monitoring is enabled within the application server environment 210, such as through access of the global variable, and whether memory monitoring is enabled for specific classes utilized in a particular transaction. When memory monitoring is enabled, the instrumented application 214 may create memory monitoring events in response to allocation of memory to objects. Memory monitoring data associated with the allocation of memory may be periodically transmitted or collected by a central collection server and interpreted to monitor memory usage.

In one particular embodiment, memory monitoring may be dynamically activated and deactivated during run time, for example, without restarting the server. In one embodiment, a user may activate memory monitoring by providing a filter that specifies which applications or classes are to be monitored and what data is to be collected. The filter may, for example, be provided through a graphical user interface, programmatically, or through a header associated with a transaction request, such as an HTTP header. In one exemplary embodiment, the central collection server may provide an interface to enable a user to specify a filter. In a particular example, the filter specifies particular classes to be monitored, criteria specifying which data is reported, and parameters describing how that data is to be reported.

Figure 5:
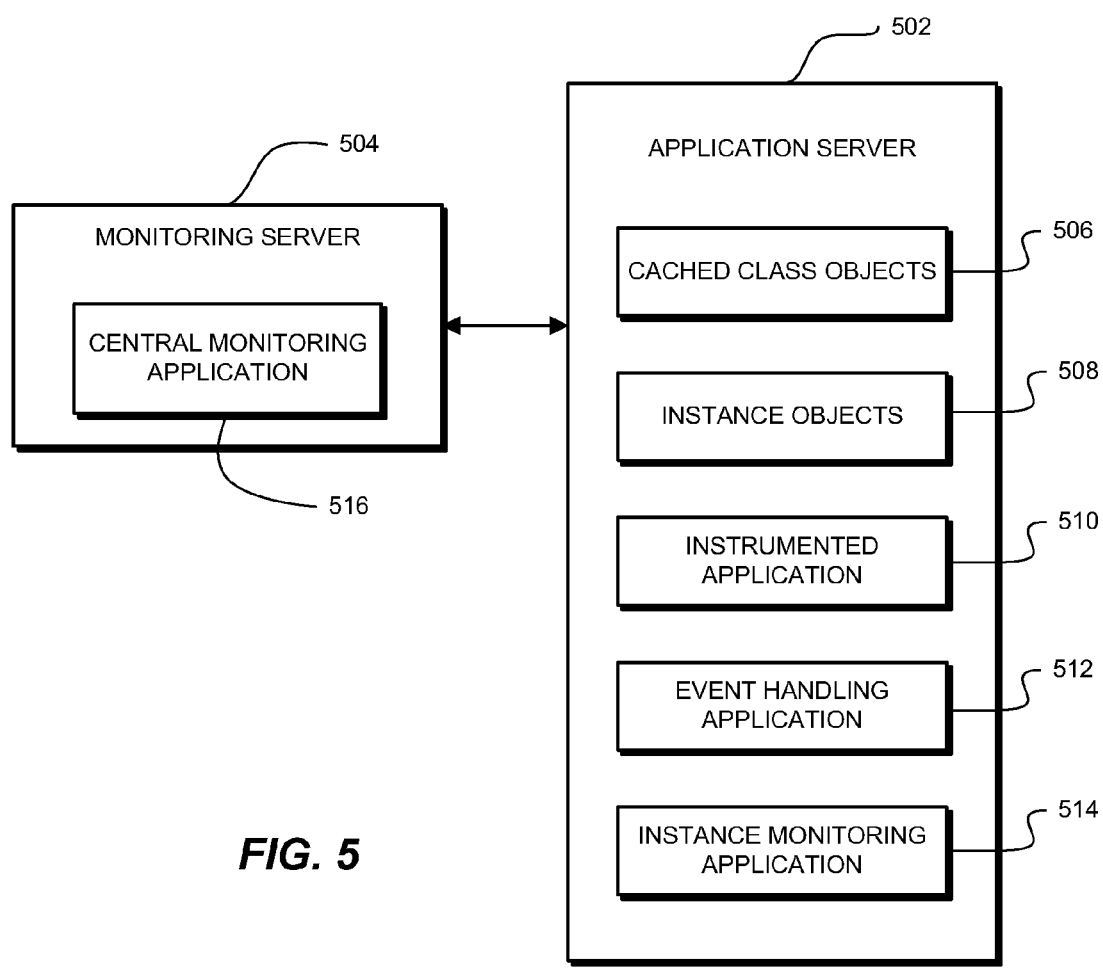
FIG. 5 includes an illustration of an exemplary monitoring system.

FIG. 5 includes an illustration of an exemplary monitoring system within an enterprise environment that includes an application server 502 and a monitoring server 504. The application server 502 includes an instrumented application 510, such as an instrumented class. The instrumented application 510 includes instructions operable to provide memory monitoring events in response to memory allocation instructions within the instrumented application 510. When the instrumented application 510 is instantiated, memory monitoring events are prepared in response to instantiating the application and instantiating instance variables associated with the instantiated application.

For example, the application 510 may be instantiated as an object. The object may further include instance variable objects, such as primitive-type objects and instantiated objects of user provided classes. In one example, a primitive-type object includes an instantiated string, integer, float, double, short, byte, char, long, or boolean object. Instantiated objects of user provided classes or non-primitive classes may also be instance variables.

In a particular embodiment, the instrumented application 510 is allocateable. Allocateable means that instantiated objects of the instrumented class or application 510 include instrumentation to create memory monitoring events associated with the instantiated objects own instantiation or allocation of memory. Typically, user-provided classes are allocateable and primitive classes or environment provided classes are not allocateable. However, some user provided classes may not be implemented as allocateable.

In one exemplary embodiment, the memory monitoring events provided in response to memory allocation are processed by an event handling application 512. For example, the event handling application 512 may create a cached class object to be stored in a set of cached class objects 506 and may create instance objects to be stored in a set of instance objects 508. The cached class object is an instance of a class configured to monitor cached classes, such as the instrumented application 510. In one embodiment, the cached class object includes identifying information about the instrumented application 510 and tracks the number of allocations or instantiations of the instrumented application 510. The cached class object may also track the number of deallocations of the instrumented application 510, such as the number of instances for which the associated memory has been garbage collected.

The instance object is an instance of a class configured to monitor instances of the instrumented application 510. In one exemplary embodiment, the instance object includes identifying information associated with the instance or object of the instrumented application 510. For example, the instance object may include a reference to the instantiated object, the location of the object, and the size of the object. In a particular embodiment, the reference to the instantiated object is a weak reference that permits garbage collection of the object. The instance object may also track whether the object is updatable. An updatable object is an object that may change in size over time. For example, an array or an object that includes an array may change in size with the addition of data. In one embodiment, the set of instance objects 508 may be associated with a particular cached class object and, in a particular embodiment, the instance object is an instance variable of the cached class object.

An instance monitoring application 514 accesses the set of class objects 506 and the set of instance objects 508 to determine the status of the instances of the instrumented application 510. In one embodiment, the instance monitoring application 514 selects a cached class object from the set of cached class objects 506 and selects an instance object from the set of instance objects 508 associated with the cached class object. The instance monitoring application 514 determines whether the object referenced by the instance object has been deallocated and sends a notification to the monitoring server 504 indicating deallocation of the object after the object has been deallocated. The instance monitoring application 514 may also send allocation notices after allocation of memory and update notices indicating object size.

A central monitoring application 516 operating in the monitoring server 504 receives and processes the notices to monitor memory usage. The central monitoring application 516 may provide data associated with memory usage to a user through an interface.

Figure 6:
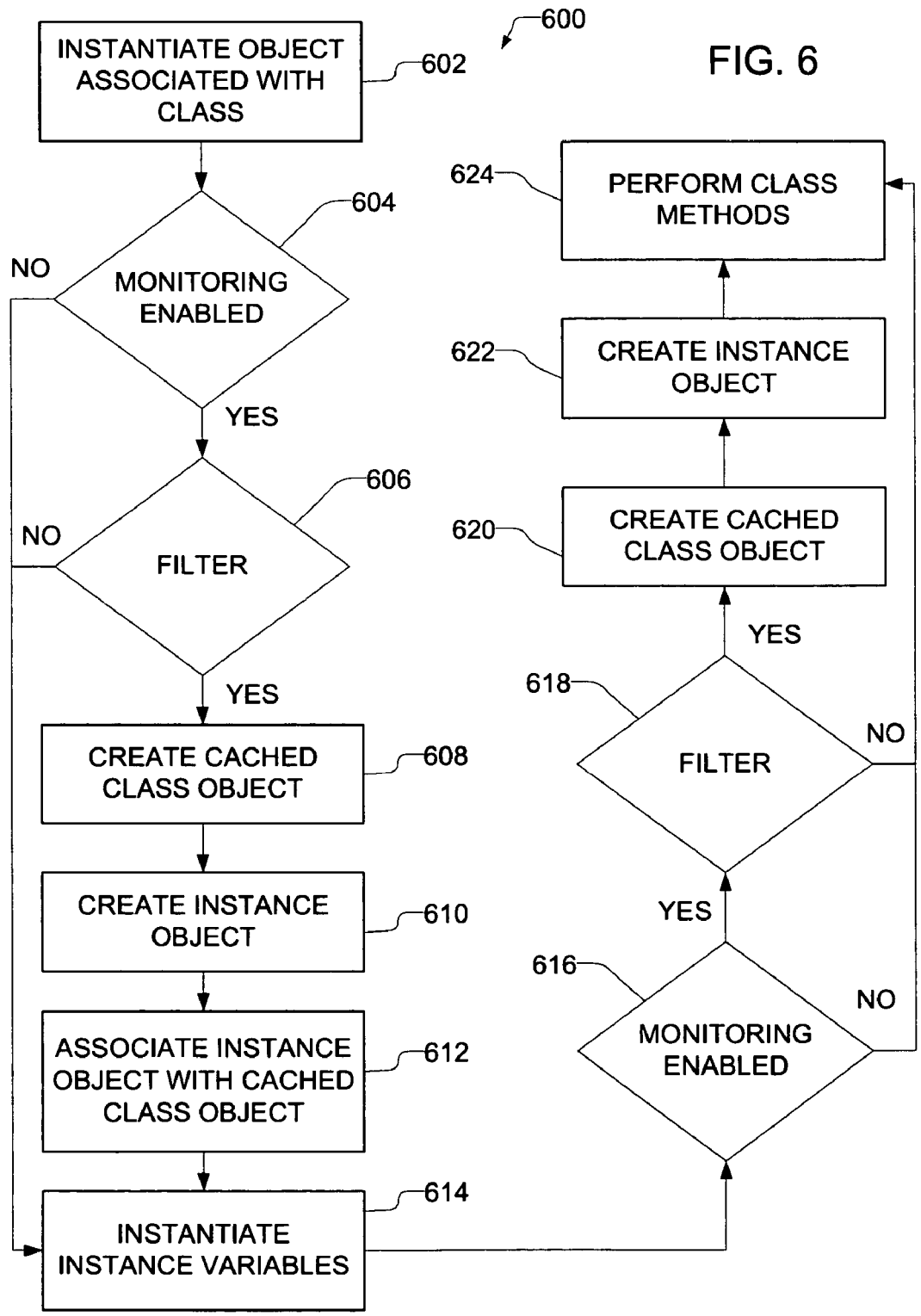
FIG. 6 includes an illustration of an exemplary method for monitoring memory usage.

FIG. 6 includes an illustration of an exemplary method 600 for monitoring memory usage. In a particular embodiment, the method is at least partially implemented by instrumenting a class prior to loading the class into an application server environment. The monitoring system includes instances of the instrumented class executed within the application server environment and may include additional monitoring applications.

When an instance of the class is instantiated within the application server environment, as illustrated at 602, the monitoring system determines whether memory monitoring is enabled, as illustrated at 604. In one exemplary embodiment, the monitoring system may determine whether monitoring is enabled globally for the application server environment. In another exemplary embodiment, the monitoring system may determine whether monitoring is enabled for a specific transaction. In a further embodiment, the monitoring system may determine both whether monitoring is enabled globally and for specific transactions. When memory monitoring is not enabled, the monitoring system continues instantiating instance variables of the class, as illustrated at 614.

When memory monitoring is enabled, the monitoring system may determine whether a filter exists that specifies monitoring for the specific class associated with the instantiated object, as illustrated at 606. A filter may, for example, specify classes that are to be monitored or may specify a depth of call history (stack) for which data is to be collected. When a matching filter does not exist, the system continues instantiating instance variables of the object, as illustrated at 614. However, when a matching filter exists, the monitoring system may create a cached class object associated with the class being instantiated when a cached class object associated with the class is not available, as illustrated at 608, and creates an instance object associated with the instantiated object, as illustrated at 610. In a particular embodiment, the instance object is assigned to the cached class object, as illustrated at 612.

The system instantiates instance variables of the object, as illustrated at 614. For each instantiated instance variable, the monitoring system determines whether memory monitoring is enabled, such as globally enabled or enabled for a specific transaction, as illustrated at 616. In a particular embodiment, the monitoring system may also determine whether the object is allocateable. Allocateable objects include instrumentation to monitor their own instantiation. As such, the monitoring system may process instantiation of allocateable objects through the allocateable object's internal instrumentation, such as beginning at 602 for each instance of an allocateable object. When an object is not allocateable, such as primitive-type objects, and when monitoring is enabled, the monitoring system may determine whether a filter exists that specifies the object type, as illustrated at 618. When a filter exists, the monitoring system creates an instance object associated with the instance variable, as illustrated at 620, and may associated the instance object with the cached class object, as illustrated at 622. Once the object is instantiated, the system may perform the object's methods, as illustrated at 624.

FIGS. 7, 8, 9, 10, and 11 include illustrations of exemplary logic implemented in classes. As illustrated, the logic is pseudo code that is similar to JAVA. In exemplary embodiments, the logic can be coded in JAVA or in Microsoft's .NET® Framework, including C# and Visual Basic .NET. Alternatively, the class may be instrumented, for example, in byte code prior to loading the associated class into an application server environment.

Figure 7:
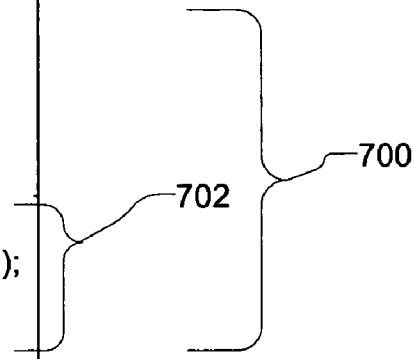

FIG. 7 illustrates an exemplary class 700 that includes instructions 702 to instantiate instance variables, such as a string and an object. FIG. 8 includes an illustration of an exemplary instrumented class 800 that instantiates the string and the object. In the illustrated embodiment, conditional logic 802 is included to determine whether memory monitoring, such as globally monitoring or transaction-based monitoring, is enabled. When monitoring is enabled, instructions are included to create a memory event associated with instantiation of the class. For example, an instruction 804 may reference a method 820 that creates memory events based on whether global monitoring or transaction-based monitoring is enabled.

In one exemplary embodiment, an instance variable is allocated memory. A call to a proxy method may replace the allocation, as illustrated at 806. In the illustrated embodiment, the proxy method is operable to determine whether the transaction-based memory monitoring is available, as illustrated at 808, and creates a transaction memory event, as illustrated at 810, when transaction-based memory monitoring is enabled. Alternately, the proxy method is operable to determine whether global monitoring is enabled, as illustrated at 812, and when enabled create a global memory event, as illustrated at 814.

In addition to determining whether monitoring is enabled, the proxy method may also determine whether the instance variable is allocateable, as illustrated both at 808 and 812. When an object, such as an instance variable, is allocateable, the object monitors its own instantiation. To avoid redundancy, the proxy method creates memory events when the instance variable is not allocateable.

Additional instrumentation, such as methods 816 and 818, may be added to the class 800. Such methods may populate instance objects configured to monitor allocation and deallocation of memory to instances of the class 800. For example, method 818 returns the object size. When the object size can change, the class and associated objects are updateable. For example, when a class includes an array, additional data may be added to the array as methods associated with the class are executed. The monitoring system tracks memory usage and changes in object size by adding methods, such as methods 816 and 818, that together determine and return the object size. Furthermore, other methods may be added to the class 800 to provide instance specific information to an associated instance object.

Figure 9:
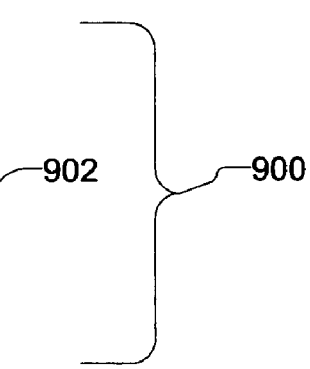

As illustrated in FIG. 8, the instrumentation logic that creates memory events for the class 800 is internal to the class 800. In another example, the instrumentation logic may be included external to a first class, such as in a second class having an instance variable associated with the first class. FIG. 9 includes an illustration of an exemplary class 900 (named "FooBarCaller") that, when instantiated, instantiates an instance variable associated with a second class (named "FooBar"), as illustrated at 902. When instrumented as illustrated in FIG. 10, the class 1000 may include a proxy method to capture instantiation of the instance variable, as illustrated at 1002. The proxy method determines whether transaction-based monitoring is enabled and whether the instance variable is allocateable, as illustrated at 1004. When transaction-based monitoring is enabled and the instance variable is not allocateable, a transaction memory event is created, as illustrated at 1006. Alternately, the proxy method may determine whether global memory monitoring is enabled and whether the instance variable is allocateable, as illustrated at 1008, and when global monitoring is enabled and the instance variable is not allocateable, a global memory event is create, as illustrated at 1010. As such, monitoring of the class "FooBar" is performed external to the class "FooBar".

The monitoring system may include an application to process memory monitoring events. FIG. 11 includes an illustration of an exemplary application 1100 for processing global memory events. When executed, logic associated with the application 1100 determines whether a filter exists for a class associated with a memory monitoring event, as illustrated at 1102. For example, an instance of a memory filter class may be created based on the class name of the class associated with the memory monitoring event. When a matching filter does not exist, the memory monitor event is ignored.

However, when a matching filter exists, a class object is created, as illustrated at 1104. The class object is associated with the class associated with the memory monitoring event. When a cached class object does not exist for the class associated with the memory monitoring event, a cached class object is created.

The cached class object may include information associated with the class associated with the memory monitoring event. For example, the cached class object may include information, such as the name and number of allocations or instantiations of the class. In one embodiment, the number of allocations is incremented in response to the memory monitoring event, as illustrated in 1106.

An instance object associated with the instance of the class associated with the monitoring event may be created, as illustrated at 1108. The instance object may store information about the instance of the class, such as a weak reference to the instance, an allocation time, a location of the allocation, and a size of the instance, as illustrated at 1110. The instance object may be associated with the class object and, in a particular embodiment, may be assigned to the class object, as illustrated at 1112.

As such, a set of cached class object are created that reference classes within the application server environment. In addition, a set of instance objects that reference instances of the classes within the application server environment are created. In particular embodiments, the instance objects are associated with or assigned to the cached class object that references the associated class. Periodically, the instance objects may be reviewed to determine whether the associated instances have been deallocated or garbage collected.

Figure 12:
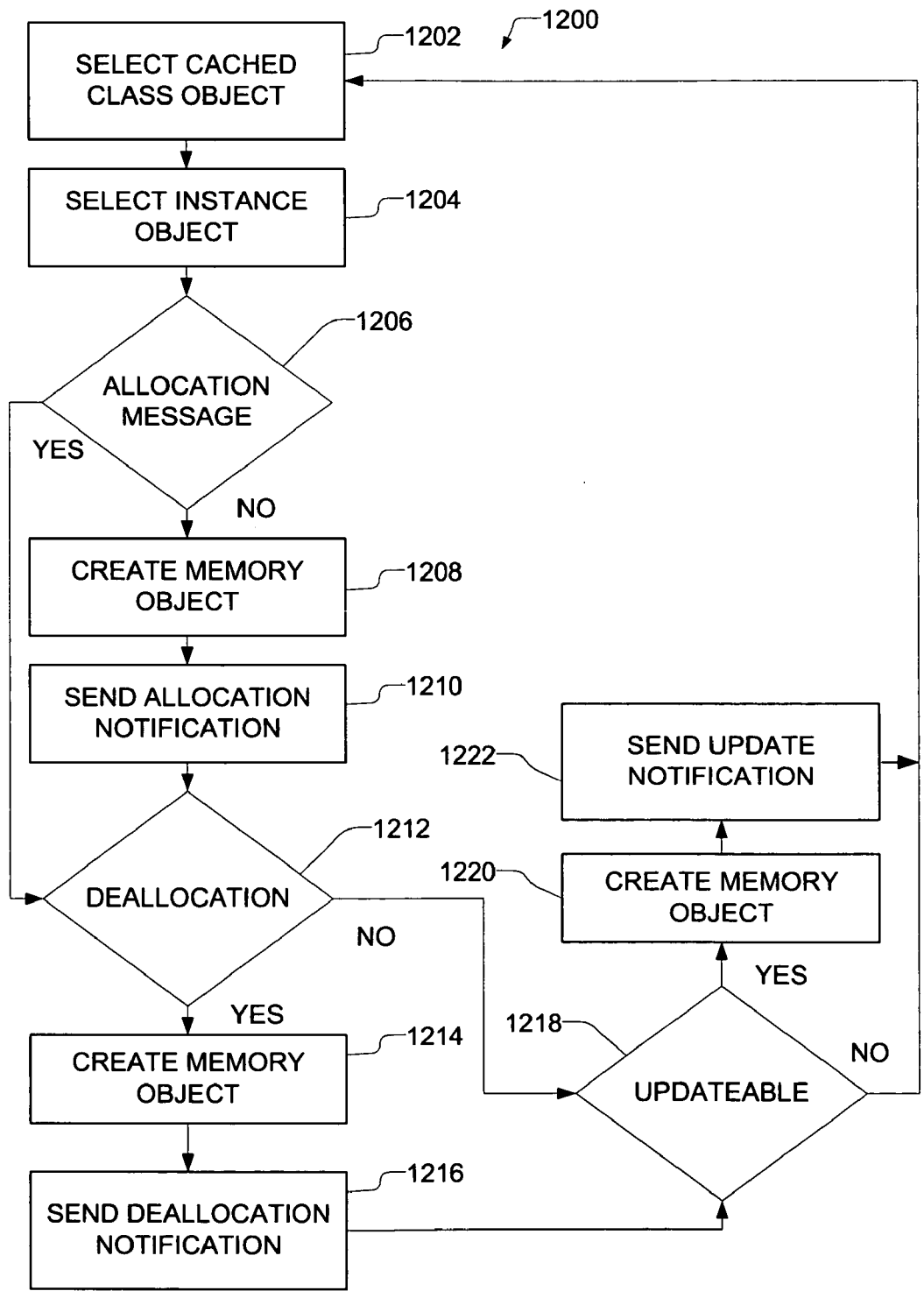
FIG. 12 includes an illustration of an exemplary method for monitoring memory usage.

FIG. 12 includes an illustration of an exemplary method 1200 for monitoring memory usage. A cached class object is selected, as illustrated at 1202, and an instance object associated with the cached class object is selected, as illustrated at 1204. The instance monitoring application determines whether an allocation notification has been sent to the central monitoring application, as illustrated at 1206. When an allocation notification has been sent, the instance monitoring application determines whether the instance has been deallocated, as illustrated at 1212.

However, when the allocation notification has not been sent, the instance monitoring application creates a memory object, as illustrated at 1208, and sends an allocation notification including the memory object to a central monitoring application, as illustrated at 1210. The memory object may include information about the instance acquired, for example, from the instance object.

The instance monitoring application determines whether the instance has been deallocated, as illustrated at 1212. For example, the weak reference included in the instance object may be referenced to determine whether memory associated with the instance has been garbage collected. When the instance has not been deallocated, the instance monitoring application determines whether the instance is updateable, as illustrated at 1218.

However, when the instance has been deallocated, the instance monitoring application creates a memory object, as illustrated at 1214, and sends a deallocation notification including the memory object to the central monitoring application, as illustrated at 1216.

The method 1200 further includes determining whether the instance is updateable. When the instance referenced by the instance object is updateable, the instance monitoring application creates a memory object, as illustrated at 1220, and sends an update notification including the memory object to the central monitoring application, as illustrated at 1222. The method may be repeated for each instance object associated with each cached class object.

FIG. 13 includes an illustration of exemplary application logic 1300 for monitoring instances of classes within the application server environment. A cached class object is selected, as illustrated at 1302, and an instance object is selected, as illustrated at 1304. When executed, the application logic determines whether an allocation notification has been sent, as illustrated at 1306. For example, the application may reference a Boolean variable that is changed to true once an allocation notification has been sent. When an allocation notification has not been sent, a memory object is created, as illustrated at 1308. For example, the memory object may include the class name, an allocation event flag, the object identification, the object size, the allocation time, and the object location. The memory object is sent to a central monitoring application, as illustrated at 13 10, and the Boolean variable is changed to true.

The application determines whether the instance associated with the instance object has been deallocated, as illustrated at 1312. For example, the application may attempt to reference the object associated with the instance. When the object does not exist, the instance has been deallocated. When the instance has been deallocated, a memory object including a flag indicating a deallocation event and other information associated with the instance and class is created, as illustrated at 1314. The memory object is sent to the central monitoring application, as illustrated at 1316, and a Boolean variable indicating that the deallocation notification has been sent is changed to true. In one embodiment, a deallocation counter in the cached class object is incremented and the instance object associated with the deallocated instance is removed.

The application may also determine whether the instance is updateable, as illustrated at 1318. When the instance is updateable, the application may create a memory object including a flag indicating an update event, as illustrated at 1320, and may send the memory object to the central monitoring application, as illustrated at 1322. The process may be repeated for each instance object of each cached class object.

Figure 14:
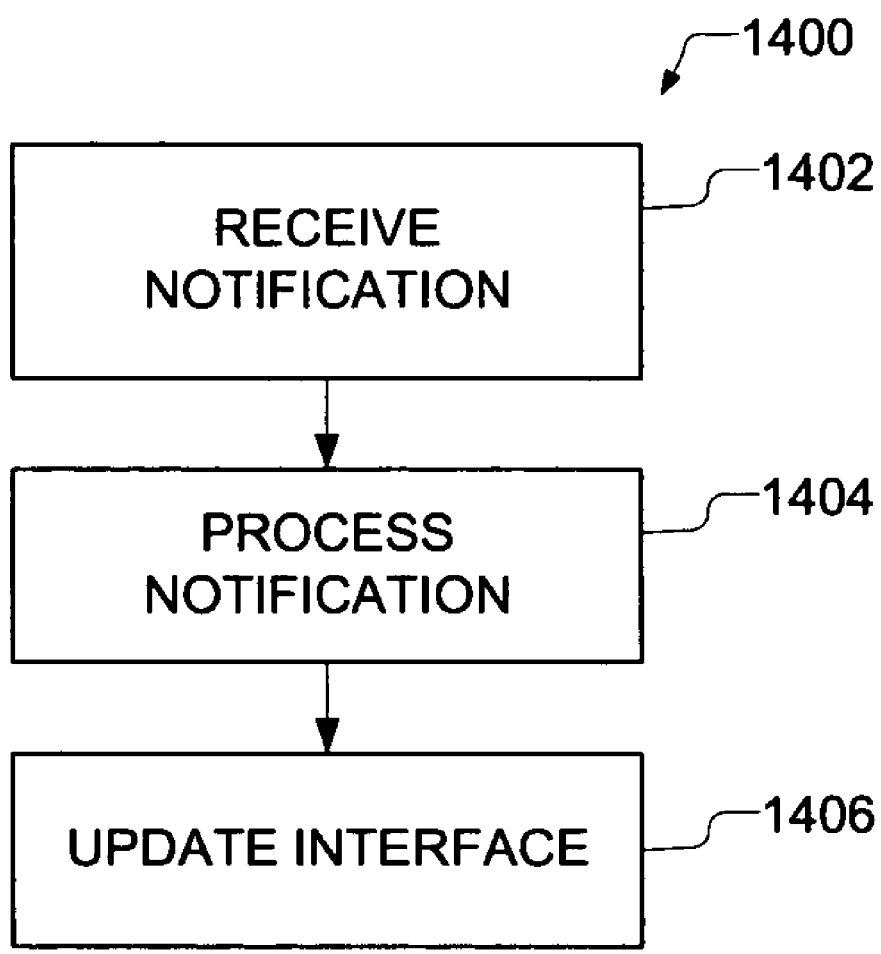
FIG. 14 includes an illustration of an exemplary method for monitoring memory.
Figure 15:
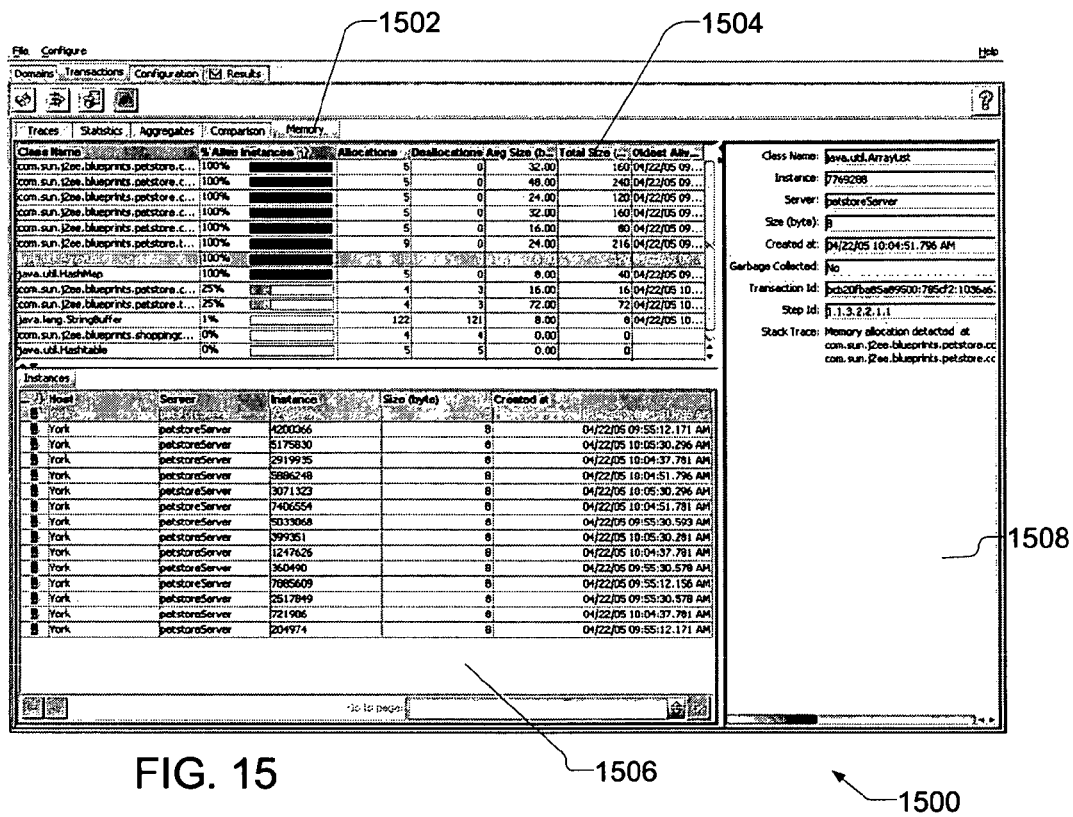
FIGS. 15, 16, 17, and 18 include illustrations of exemplary graphical user interfaces for use in memory monitoring.
Figure 16:
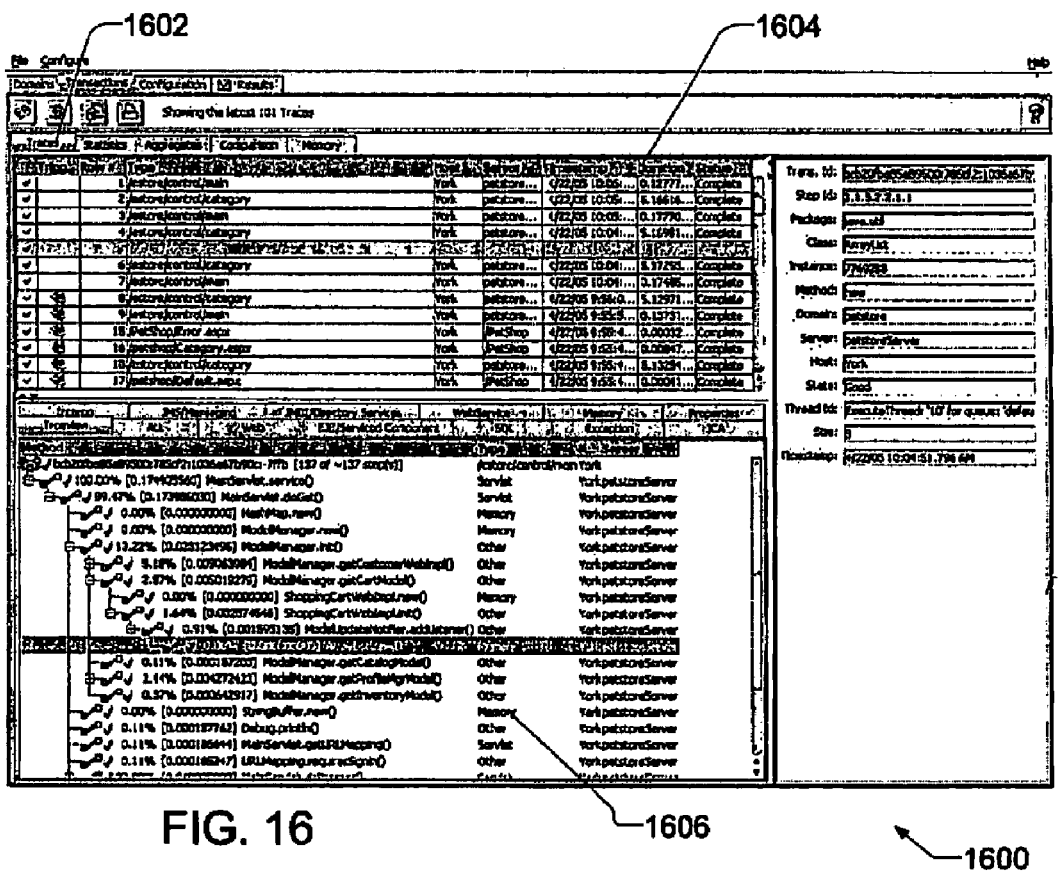
Figure 17:
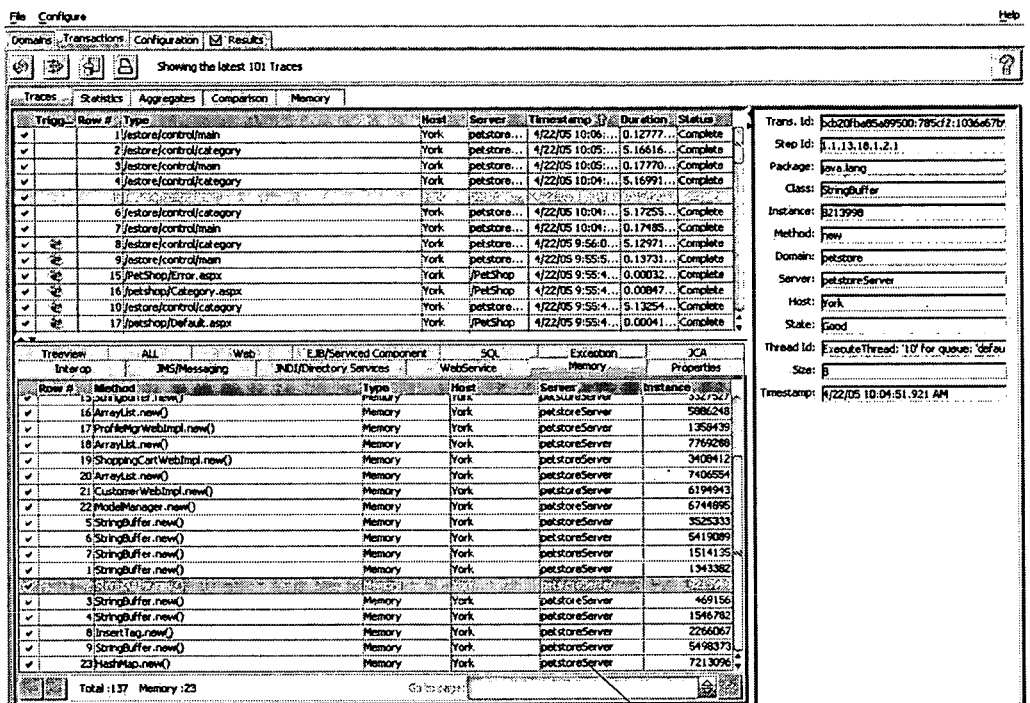

The central server or monitoring server includes the central monitoring application that receives the notifications. In one particular embodiment, the central monitoring application receives notifications from more than one application server that includes instance monitoring applications. FIG. 14 includes an illustration of an exemplary method 1400 for monitoring memory usage. The monitoring application receives memory event notifications, as illustrated at 1402. For example, the memory event notifications may be allocation events, deallocation events, or update events. The monitoring application processes the memory event notifications, as illustrated at 1404. In one exemplary embodiment, the monitoring application acquires data from the notification, such as data included in a memory object and adds the data into a database. Exemplary databases include object-based databases and relational databases. In addition, the monitoring application or a separate application may provide a graphical user interface, as illustrated at 1406. Typically, the graphical user interface provides user access to information about memory usage and object instantiation globally for the enterprise environment or for specific transactions within the enterprise environment. FIGS. 15, 16 and 17 include illustrations of an exemplary graphical user interface.

FIG. 15 illustrates an interface 1500 for displaying memory usage for an enterprise environment. When the memory tab 1502 is selected, a list of classes is provided in frame 1504. The list of classes may include information, such as the class name, the percentage of alive instances, the number of allocated instances, the number of deallocated instances, the average size of an instance, the total size of all instances, and data about the oldest object. The percentage of alive instances is the difference between the number of allocated instances and the number of deallocated instances divided by the number of allocated instances. A large percentage of persisted instances of a particular class may indicate a deallocation problem. Such a problem may also be indicated by the age of the oldest persisted instance. In addition, a large average size of instances may indicate poor memory usage. Further, when the instances use a large total memory, the instances may cause a memory shortage. The data in frame 1504 may be sorted by a category of one of the columns. For example, the data may be sorted by the class name, the percentage alive, the total memory usage, or the age of the oldest instance.

When a class is selected, the data associated with individual instances is displayed in frame 1506. The data may include the host, server, instance ID, size, and allocation time. The data may be sorted by a category of one of the columns. When a specific instance is selected, additional details, such as location, transaction ID, and trace data may be displayed in frame 1508.

In another example, FIG. 16 illustrates an interface 1600 associated with transaction tracing. For example, when the trace tab 1602 is selected, frame 1604 includes data about specific transactions. The data may include the trace number, type, location, timestamp, duration, and status. When a specific trace is selected, data about objects executed or accessed during the transaction are presented in frame 1606. As illustrated, the data may be presented in a tree view. Alternatively, the information may be presented based on method, as illustrated in frame 1706 of FIG. 17.

Figure 18:
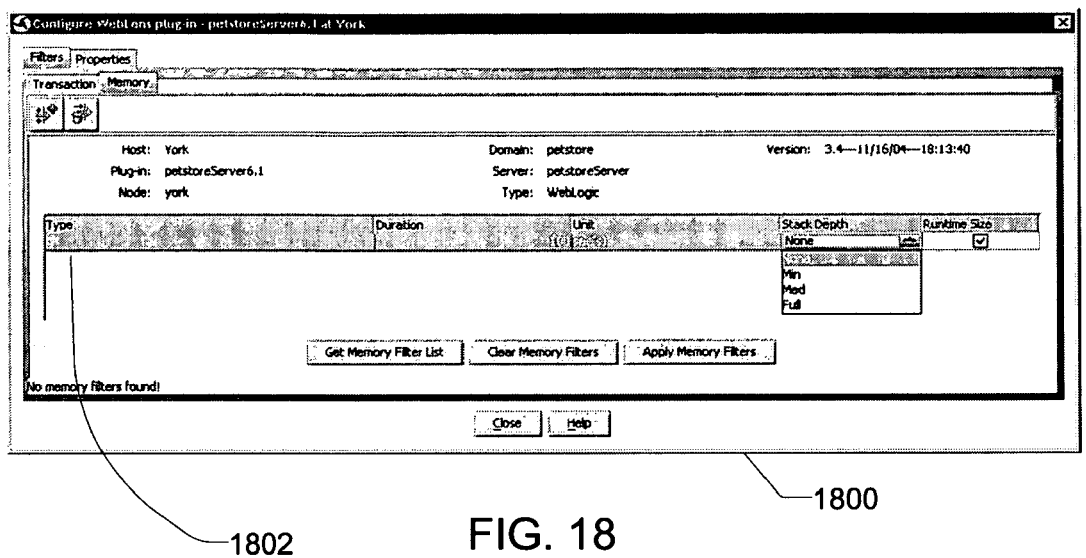

The graphical user interface may also be used to establish filters for monitoring specific transactions or specific objects or object types. In addition, the interface may permit dynamic activation of tracing and memory monitoring. Dynamic activation permits tracing and memory monitoring without restarting servers within the enterprise environment or the enterprise. FIG. 18 includes an illustration of an exemplary graphical user interface 1800 for specifying filters. Filters may be specified to selectively monitor memory usage on specific domains and servers, for specific classes or data types, or for combinations thereof. The exemplary graphical user interface 1800 includes an entry control 1802 for specify the data type to be monitored, the duration of the monitoring, the stack depth, and tracking of runtime size, for example, for arrays. Specifying a duration permits monitoring for a preset period of time. The stack depth may specify the amount of call history that is collected and, as illustrated, has optional values: none, minimum, medium, and full. When "none" is specified, calls are not monitored. "Minimum" may, for example, specify that the monitoring includes at least details regarding one level of stack depth. "Medium" may specify a specific stack depth for which details are collected, such as up to 7 levels, and "full" may specify that details are to be collected for all of the calls within the transaction.

Portions of the methods described herein may be implemented in software code for carrying out the methods described. In one embodiment, the code may be contained on a data storage device, such as a hard disk, magnetic tape, floppy diskette, optical storage device, networked storage device(s), or other appropriate data processing system readable medium or storage device. In addition, an application operable to add instructions operable to perform portions of the methods to instrumented applications may be stored on a computer readable media.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of monitoring memory usage, the method comprising:
    determining whether memory monitoring is enabled within an application server environment from within an application executing within the application server environment;
    creating a memory allocation event after determining that memory monitoring is enabled, the memory allocation event associated with an object that is an instance of a first class, wherein the first class is a cached class;
    allocating memory to the object;
    creating a cached class object, wherein:
        the cached class object references the first class;
        the cached class object is an instance of a second class configured to monitor cached classes; and
        the cached class object tracks the number of allocations and deallocations of the first class;
    creating an instance object that includes a reference to the object, wherein the instance object is an instance of a third class configured to monitor instances of the first class;
    adding the instance object to a set of instance objects of the cached class object;
    determining whether memory associated with the object has been deallocated by determining whether memory associated with the object has been garbage collected by referencing an acquired reference to the object from the instance object; and
    sending a memory event notification to a monitoring system in response to determining that the object has been deallocated.

2. The method of claim 1, wherein determining, creating the memory allocation event, and allocating are performed upon instantiation of the application.

3. The method of claim 1, wherein determining, creating the memory allocation event, and allocating are performed through execution of the application.

4. The method of claim 1, wherein determining whether memory monitoring is enabled comprises determining whether memory monitoring is globally enabled for the application server environment.

5. The method of claim 1, wherein determining whether memory monitoring is enabled comprises determining whether memory monitoring is enabled for a particular transaction associated with the application.

6. The method of claim 1, wherein the method further comprises determining whether the object is allocateable.

7. The method of claim 6, wherein creating the memory allocation event occurs subsequent to determining that the object is not allocateable.

8. The method of claim 1, wherein the method further comprises accessing a filter associated with the first class.

9. The method of claim 1, wherein the object is an allocateable object.

10. The method of claim 9, wherein the allocateable object includes internal memory monitoring instrumentation.

11. The method of claim 1, wherein the object is not an allocateable object.

12. A computer readable medium comprising computer-implemented instructions operable by a processor:
    to acquire a reference to an instance of a first class from an instance object that is an instance of a second class configured to monitor instances of the first class, wherein the first class is a cached class;
    to determine whether the instance of the first class has been deallocated by determining whether memory associated with the instance of the first class has been garbage collected by referencing the acquired reference to the instance of the first class;
    to send a memory event notification to a monitoring system in response to determining that the instance of the first class has been deallocated; and
    to select a cached class object from a set of cached class objects, wherein:
        the instance object is associated with the cached class object;
        the cached class object references the first class;
        the cached class object is an instance of a third class configured to monitor cached classes; and
        the cached class object tracks the number of allocations and deallocations of the first class.

13. The computer readable medium of claim 12, wherein to determine whether the instance of the first class has been deallocated comprises accessing the instance of the first class.

14. The computer readable medium of claim 12, further comprising computer-implemented instructions to create a memory object associated with the instance of the first class and to send the memory event notification in connection with creating the memory object.

15. The computer readable medium of claim 12, further comprising computer-implemented instructions to determine whether an allocation memory event notification has been sent and to send the allocation memory event notification when the allocation memory event notification has not been sent.

16. The computer readable medium of claim 12, further comprising computer-implemented instructions to determine whether the instance of the first class is updateable and to send an update notification when the instance of the first class is updateable.

17. A monitoring system comprising:
   a computer memory;
   a server comprising the computer memory, the server implementing an application environment that comprises an application;
   a set of cached class objects stored within the computer memory, wherein:
   the set of cached class objects includes a cached class object that includes a reference to a first class;
   the cached class object is an instance of a second class configured to monitor cached classes; and
   the cached class object tracks the number of allocations and deallocations of the first class;
   a set of instance objects stored within the computer memory and associated with the cached class object, the set of instance objects including an instance object that includes a reference to an instance of the first class, wherein the instance object is an instance of a third class configured to monitor instances of the first class;
   the application operable to access the set of cached class objects and the set of instance objects to acquire the instance object and operable to determine whether memory associated with the instance of the first class has been deallocated by determining whether memory associated with the instance of the first class has been garbage collected by referencing an acquired reference to the instance of the first class from the instance object; and
   a monitoring server, wherein the application operable to transmit a notification to the monitoring server in response to determining that memory associated with the instance of the first class has been deallocated.

* * * * *